United States Patent [19]

Shewchuk

[11] 3,837,752

[45] Sept. 24, 1974

[54] COUPLING FOR BREAK AWAY POLE BASES

[76] Inventor: John Shewchuk, 645 Grierson Ave., Winnipeg, Manitoba, Canada

[22] Filed: Jan. 26, 1973

[21] Appl. No.: 326,580

[52] U.S. Cl............................ 403/2, 52/98, 52/295, 248/158
[51] Int. Cl............................................. F16b 31/00
[58] Field of Search ...... 287/20 R; 256/13.1; 285/3, 285/4, 2; 52/98; 248/158; 52/295; 403/2

[56] References Cited
UNITED STATES PATENTS

| | | | |
|---|---|---|---|
| 2,282,641 | 5/1942 | Corey | 285/2 |
| 3,521,413 | 7/1970 | Scott et al. | 248/158 |
| 3,552,698 | 1/1971 | Kinney | 287/20 R |
| 3,630,474 | 12/1971 | Minor | 52/98 |
| 3,637,244 | 1/1972 | Strizki | 52/98 |

*Primary Examiner*—Jordan Franklin
*Assistant Examiner*—Conrad L. Berman
*Attorney, Agent, or Firm*—Stanley G. Ade

[57] ABSTRACT

A pole has a base and is secured to an anchor block and spaced above same by a plurality of couplers which are frangible if the force of impact upon the pole exceeds forces such as wind force, normally encountered. Normally such impact forces would be those encountered when a vehicle strikes the pole and the coupler should fracture at a force less than that which is considered critical to the occupants. However, the principle can be utilized under other circumstances if desired.

2 Claims, 5 Drawing Figures

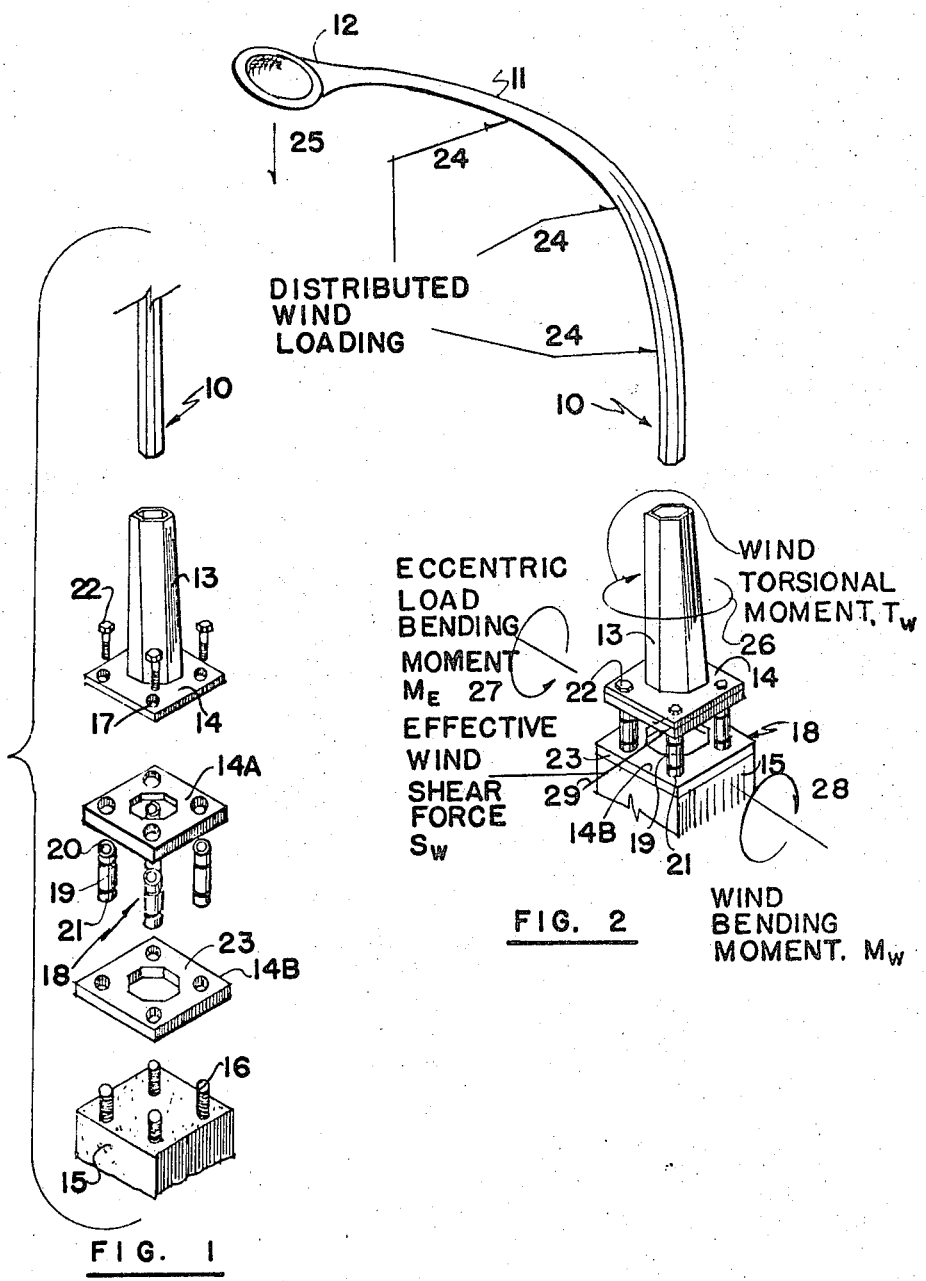

3,837,752

COUPLING FOR BREAK AWAY POLE BASES

BACKGROUND OF THE INVENTION

This invention relates to new and useful improvements in coupler assemblies for break-away pole bases and although it is designed primarily for use for light and power poles normally encountered upon streets and roads, nevertheless it should be understood that the claims do not limit such use.

Conventionally, such poles are made of metal in either a cylindrical or polygonal cross-sectional hollow form. They are normally quite high and usually include an offset portion to support luminaire in the case of light poles or cross members in the case of power poles.

When a vehicle strikes such poles, the rapid deceleration of the automobile or vehicle normally causes injury to the occupants and if sufficient force is present, the pole is either bent or broken depending upon the forces of impact and the strength of material used in the manufacture of such poles. Because of the circular or polygonal cross-section these poles are extremely strong and damage often occurs to the occupants of vehicles striking same.

SUMMARY OF THE INVENTION

The present invention seeks to overcome these disadvantages by providing a break-away pole base the strength of which is designed to be sufficient for all wind or other loads normally encountered by the pole, yet at the same time will permit the pole to break away from the base when struck by a force less than required for that deceleration of the vehicle which is considered critical to the occupants. It is believed that will prevent serious damage from occurring to the occupants of the vehicle under the majority of circumstances.

Another advantage flowing from the above is the fact that apart from damage to the luminaire, the pole can, in most circumstances, be re-used merely by replacing the break-away base elements.

The principal object and essence of the invention is therefore to provide a break-away base assembly for poles which will support the pole under all normal conditions of use unless impacted with a force greater than normal use at which time the break-away base will fracture thus allowing the pole to move from the support without rapidly absorbing the force of impact.

Another object of the invention is to provide a device of the character herewithin described in which the break-away base assembly is easily replaced.

A still further object of the invention is to provide a device of the character herewithin described which can be used with conventional poles having base plates or the like secured thereon.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is an isometric exploded view of a pole assembly with the invention incorporated therein.

FIG. 2 is a view similar to FIG. 1, but showing the pole assembly installed.

In the drawings like characters of reference indicate corresponding parts in the different figures.

DETAILED DESCRIPTION

Figure 3:
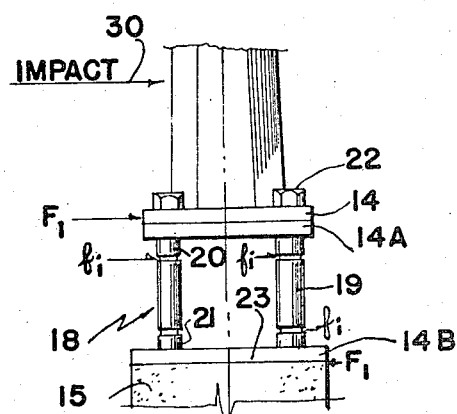
FIG. 3 is a fragmentary side elevation of the base assembly showing various loads thereon.

Proceeding therefore to describe the invention in detail, reference character 10 generally illustrates a light pole, but of course the pole may be used for other purposes.

The pole is normally polygonal in cross-section and extends upwardly and then curves over as at 11 to support a conventional luminaire 12 upon the distal end thereof as clearly shown.

The cross-sectional dimensions of such poles normally increase from the distal end towards the base 13 for strength purposes and a flange or base portion or plate 14 is normally welded to the base 13 of the pole 10.

Support means taking the form of a concrete base 15 are usually provided, it being understood that this block 15 is normally embedded in the ground and is enlarged at the lower end thereof to give full support.

Normally, studs 16 extend upwardly from the base or anchor block 15 and extend through apertures 17 within the base plate or flange 14 whereupon nuts (not illustrated) secure the base plate to the anchor block 15 thus making a extremely rigid assembly under which circumstances the full impact from a vehicle striking the pole is usually absorbed by the vehicle and the occupants with some damage occasionally occuring to the pole in the form of bending same or in the case of extreme impact, breaking or tearing it away from the anchor block 15.

The break-away base assembly is collectively designated 18 and, in this embodiment, consists of an upper stiffener plate 14A, a plurality of cylindrical elements or couplers 19 and a lower stiffener plate 14B.

The stiffener plates 14A and 14B are made of steel or of other high strength material, and are of plane dimensions similar to base plate 14. Both plates 14A and 14B are provided with holes in the corners corresponding to the holes in base plate 14, and of such size as to permit easy entry of bolts 22 and studs 16 respectively in the assembled condition, and with a central hole of such dimension as required to permit a continuous passage from the base block 15 to the inside of pole 13 for the purpose of conveying electrial wires, etc.

Figure 4:
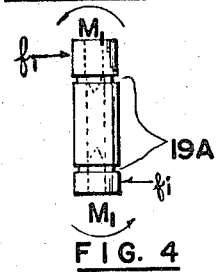
FIG. 4 is a side elevation of one of the coupler elements per se.

The couplers 19 are preferably of round cylindrical form and are fabricated of high strength, low impact resistance material such as high grade cast iron. It is especially important that the inner core material be a high quality base for the internal screw threads at each end of the coupler. In addition the couplers have circumferential grooves 19A and 19B located near the coupler extremities as shown in FIG. 4.

The individual elements or couplers 19 are screw-threadably engaged upon the studs 16, which protrude through the lower stiffener plate 14B, by the lower ends 21 thereof whereupon the upper stiffener plate 14A and base plate 14 are rested upon the upper ends 20 and bolts 22 are engaged through the aperture 17 and the corresponding aperture in 14A and screw-threadably engaged within the upper ends 20 of the couplers thus bolting the assembly firmly together and maintaining the base plate 14 in spaced and parallel relationship above and with the upper side 23 of the anchor block or base block 15.

These couplers are frangible and are designed to break away when a force greater than forces normally encountered, is applied to the pole 10.

FIG. 2 shows the forces normally acting upon a light pole or the like.

Arrows 24 indicate distributed wind loading and arrow 25, an eccentric load due to the overhanging luminaire 12.

Arrow 26 indicates the wind torsional moment and arrow 27, the eccentric load bending moment. Arrow 28 indicates the wind bending moment and the effective windship forces indicated by arrow 29.

In normal operation the critical forces in the couplers 19 are axial forces resulting from the wind bending moment 28 and from the eccentric load bending moment 27. The design of the couplers 19 is, of course, sufficient to withstand these axial forces under the most extreme conditions.

However, if an impact force is applied to the poles such as that which would be caused by a moving automobile striking the pole just above the coupling, then the following forces and moments will be present.

Reference character 30 illustrates an impact force in FIG. 3. This impact force $F_1$ which is related to the deceleration of the striking vehicle is transmitted by components $f_i$ in the couplers 19 to the base 15 and is reacted by the base. Because the plates 14, 14A and 14B in the assembled and tightened condition create a rigid connection between coupler extremity and said plates, the component forces $f_i$ produce a bending moment $M_1$ in each coupler as shown in FIG. 4.

Figure 5:
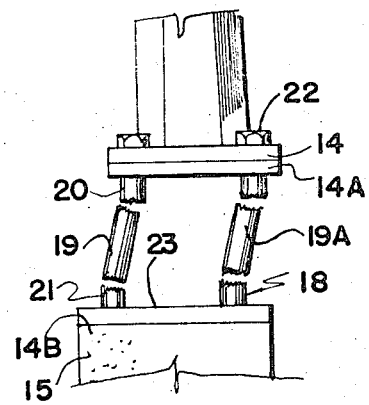
FIG. 5 is a view similar to FIG. 3 but showing the effect of the impact upon the pole.

The individual couplers are so designed and constructed that they will fracture from bending as shown in FIG. 5 if the impact force is sufficiently high to create at each end of each coupler that magnitude of bending moment which will be denoted as the breaking moment. Of course, for the mode of failure shown in FIG. 5, the effective combined stiffness of plates 14 and 14A and the stiffness of plate 14B must be sufficient, by design, to generate a breaking moment at the top and at the bottom respectively in each coupler.

The specific reason for designing a bending mode fracture is that it permits a means of obtaining the required bending weakness in the coupler with no appreciable loss in its axial strength in the manner following.

First, the required axial strength for normal operation is used to determine the coupler cross-sectional area with due consideration of the material of fabrication and of any stress concentrations present. Secondly, the couplers are designed with the maximum permissible bending strength in assembly, with no appreciable loss in axial strength, by judiciously resorting to any one or any combination of the following inherent and relevant principles pertaining to the assembly of invention.

The maximum resistance of a coupler to bending fracture can be decreased by introducing circumferential grooves 19A and 19B with such geometry at the base of the groove as may be required to give the desired effect of stress concentration in bending. The distance from the groove to the coupler extremity is approximately equal to or is slightly less than the inserted length of the bolt or stud in the coupler. This is significant because in this position the groove has little effect, other than to reduce the net cross section, on the axial load transfer capability between the inside bolt and the coupler since the inner thread governs as the critical axial stress concentration. At the same time the groove retains its effect as a stress concentrator for inducing bending fracture and, additionally, its position permits the maximum effective length of moment arm and, hence, maximum bending moment. The grooves are used, however, as required to give a better control on the bending strength.

When the couplers fail as a result of a lateral impact force the pole will part from the anchor block 15 and will be propelled forward.

Of course, the maximum design permissible force F1, is much greater than the design windsheer force shown by arrow 29 so that the pole assembly is completely stable in normal use and under all circumstances except the source of impact.

If the pole is broken away from the anchor block, normally only the luminaire 12 would be damaged and the pole can easily be re-installed by the provision of new coupler elements 19.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A break-away base assembly for detachably connecting an existing apertured pole base plate to an anchor block assembly which includes anchor studs extending upwardly therefrom and bolt means extending through said pole base plate; comprising in combination an apertured lower stiffener plate engagable over the studs with said studs extending therethrough, a plurality of couplers, said couplers each comprising an element having internal screw-threads formed in each end thereof and being screw-threadably engagable upon said studs by the lower ends thereof whereby said lower stiffener plate is clamped to the upper side of said anchor block assembly, means to control the bending stress of said coupler elements with minimum effect on the axial load transfer capability thereof, said means including at least one circumferential groove formed around said coupler elements and adjacent the upper end thereof, located and spaced from the upper end of said coupler elements sufficient distance wherein said bolt means extend within said internal screw threads of said coupler elements a distance at least equal to the position of said groove, an apertured upper stiffener plate engagable upon the upper ends of said coupler elements with the apertures in said upper plate aligned with the internal screw-threads formed in the upper ends of said elements, said pole base plate being engagable upon said upper stiffener plate with the apertures in said pole base plate aligned with the apertures in said upper stiffener plate whereby said bolt means extends through the apertures in said pole base plate and the apertures in said upper stiffener plate and screw-threadably engage said screw-threads formed in the upper ends of said elements in clamping engagement to provide a rigid assembly for holding said pole base plate in spaced and parallel relationship with the upper side of said anchor block, said elements being designed to fail by fracture if the pole experiences near its base, a lateral force greater than normal but less than a predetermined maximum force thus causing the pole to separate from the anchor block.

2. The device according to claim 1 which includes means to control the bending stress of said coupler elements with minimum effect on the axial load transfer capabilities thereof, said means including at least one circumferential groove formed around said coupler and adjacent the lower end thereof located and spaced from the upper end of said coupler elements sufficient distance wherein said bolt means extend within said internal screw threads of said coupler elements a distance at least equal to the position of said groove.

* * * * *